(12) United States Patent
McSweeney (10) Patent No.: US 9,541,907 B2
(45) Date of Patent: Jan. 10, 2017

(54) SYSTEM AND METHOD FOR CALIBRATING PARAMETERS FOR A REFRIGERATION SYSTEM WITH A VARIABLE SPEED COMPRESSOR

(75) Inventor: Daniel L. McSweeney, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 2317 days.

(21) Appl. No.: 12/247,001

(22) Filed: Oct. 7, 2008

(65) Prior Publication Data

US 2009/0094997 A1 Apr. 16, 2009

Related U.S. Application Data

(60) Provisional application No. 60/978,292, filed on Oct. 8, 2007, provisional application No. 60/978,258, filed on Oct. 8, 2007.

(51) Int. Cl.
*F25B 49/02* (2006.01)
*G05B 13/02* (2006.01)
*F25B 49/00* (2006.01)

(52) U.S. Cl.
CPC ........... *G05B 13/024* (2013.01); *F25B 49/025* (2013.01); *F25B 49/005* (2013.01);
(Continued)

(58) Field of Classification Search
USPC ................................................ 62/126, 228.1
See application file for complete search history.

(56) References Cited

U.S. PATENT DOCUMENTS

| 2,883,255 A | 4/1959 | Anderson |
| 2,981,076 A | 4/1961 | Gaugler |

(Continued)

FOREIGN PATENT DOCUMENTS

| CN | 1051080 A | 5/1991 |
| CN | 1382912 A | 12/2002 |

(Continued)

OTHER PUBLICATIONS

International Search Report regarding International Application No. PCT/US2008/011576 dated Mar. 23, 2009.

(Continued)

*Primary Examiner* — Jonathan Bradford
(74) *Attorney, Agent, or Firm* — Harness, Dickey & Pierce, P.L.C.

(57) ABSTRACT

A system and method for calibrating parameters for a refrigeration system having a variable speed compressor is provided. A compressor is connected to a condenser and an evaporator. A condenser sensor outputs a condenser signal corresponding to at least one of a sensed condenser pressure and a sensed condenser temperature. An inverter drive modulates a frequency of electric power delivered to the compressor to modulate a speed of the compressor. A control module is connected to the inverter drive and determines a measured condenser temperature based on the condenser signal, monitors electric power data and compressor speed data from the inverter drive, calculates a derived condenser temperature based on the electric power data, the compressor speed data, and compressor map data for the compressor, compares the measured condenser temperature with the derived condenser temperature, and updates the compressor map data based on the comparison.

9 Claims, 8 Drawing Sheets

(52) U.S. Cl.
CPC ..... *F25B 2500/19* (2013.01); *F25B 2600/021* (2013.01); *F25B 2700/151* (2013.01); *F25B 2700/2116* (2013.01); *F25B 2700/2117* (2013.01); *F25B 2700/21152* (2013.01); *Y02B 30/741* (2013.01)

(56) References Cited

U.S. PATENT DOCUMENTS

| | | | |
|---|---|---|---|
| 3,082,609 A | 3/1963 | Ryan et al. | |
| 3,242,321 A | 3/1966 | Chope | |
| 3,265,948 A | 8/1966 | Sones et al. | |
| 3,600,657 A | 8/1971 | Pfaff et al. | |
| 4,130,997 A | 12/1978 | Hara et al. | |
| 4,280,910 A | 7/1981 | Baumann | |
| 4,370,564 A | 1/1983 | Matsushita | |
| 4,448,038 A | 5/1984 | Barbier | |
| 4,460,861 A | 7/1984 | Rosa | |
| 4,461,153 A | 7/1984 | Lindner et al. | |
| 4,507,936 A | 4/1985 | Yoshino | |
| 4,527,399 A | 7/1985 | Lord | |
| 4,653,280 A | 3/1987 | Hansen et al. | |
| 4,706,469 A | 11/1987 | Oguni et al. | |
| 4,750,338 A | 6/1988 | Hingst | |
| 4,940,929 A | 7/1990 | Williams | |
| 4,974,427 A | 12/1990 | Diab | |
| 5,056,712 A | 10/1991 | Enck | |
| 5,058,389 A | 10/1991 | Yasuda et al. | |
| 5,182,918 A | 2/1993 | Manz et al. | |
| 5,255,529 A | 10/1993 | Powell et al. | |
| 5,258,901 A | 11/1993 | Fraidlin | |
| 5,269,146 A | 12/1993 | Kerner | |
| 5,291,115 A | 3/1994 | Ehsani | |
| 5,315,214 A | 5/1994 | Lesea | |
| 5,347,467 A | 9/1994 | Staroselsky et al. | |
| 5,359,276 A | 10/1994 | Mammano | |
| 5,359,281 A | 10/1994 | Barrow et al. | |
| 5,410,221 A | 4/1995 | Mattas et al. | |
| 5,410,235 A | 4/1995 | Ehsani | |
| 5,425,246 A | 6/1995 | Bessler | |
| 5,426,952 A | 6/1995 | Bessler | |
| 5,440,218 A | 8/1995 | Oldenkamp | |
| 5,502,970 A | 4/1996 | Rajendran | |
| 5,506,930 A | 4/1996 | Umida | |
| 5,519,300 A | 5/1996 | Leon et al. | |
| 5,524,449 A | 6/1996 | Ueno et al. | |
| 5,603,222 A | 2/1997 | Dube | |
| 5,603,227 A | 2/1997 | Holden et al. | |
| 5,646,499 A | 7/1997 | Doyama et al. | |
| 5,663,627 A | 9/1997 | Ogawa | |
| 5,712,551 A | 1/1998 | Lee | |
| 5,712,802 A | 1/1998 | Kumar et al. | |
| 5,742,103 A | 4/1998 | Ashok | |
| 5,786,992 A | 7/1998 | Vinciarelli et al. | |
| 5,903,138 A | 5/1999 | Hwang et al. | |
| 5,960,207 A | 9/1999 | Brown | |
| 5,963,442 A | 10/1999 | Yoshida et al. | |
| 6,005,365 A | 12/1999 | Kaneko et al. | |
| 6,028,406 A | 2/2000 | Birk | |
| 6,035,653 A * | 3/2000 | Itoh et al. | 62/228.4 |
| 6,041,609 A | 3/2000 | Hornsleth et al. | |
| 6,065,298 A | 5/2000 | Fujimoto | |
| 6,073,457 A | 6/2000 | Kampf et al. | |
| 6,091,215 A | 7/2000 | Lovett et al. | |
| 6,091,233 A | 7/2000 | Hwang et al. | |
| 6,102,665 A | 8/2000 | Centers et al. | |
| 6,116,040 A | 9/2000 | Stark | |
| 6,123,146 A | 9/2000 | Dias | |
| 6,222,746 B1 | 4/2001 | Kim | |
| 6,226,998 B1 | 5/2001 | Reason et al. | |
| 6,236,183 B1 | 5/2001 | Schroeder | |
| 6,236,193 B1 | 5/2001 | Paul | |
| 6,259,614 B1 | 7/2001 | Ribarich et al. | |
| 6,281,656 B1 | 8/2001 | Masaki et al. | |
| 6,281,658 B1 | 8/2001 | Han et al. | |
| 6,316,918 B1 | 11/2001 | Underwood et al. | |
| 6,318,100 B1 | 11/2001 | Brendel et al. | |
| 6,318,101 B1 | 11/2001 | Pham et al. | |
| 6,321,549 B1 | 11/2001 | Reason et al. | |
| 6,326,750 B1 | 12/2001 | Marcinkiewicz | |
| 6,344,725 B2 | 2/2002 | Kaitani et al. | |
| 6,370,888 B1 | 4/2002 | Grabon | |
| 6,373,200 B1 | 4/2002 | Nerone et al. | |
| 6,396,229 B1 | 5/2002 | Sakamoto et al. | |
| 6,404,154 B2 | 6/2002 | Marcinkiewicz et al. | |
| 6,406,265 B1 | 6/2002 | Hahn et al. | |
| 6,414,462 B2 | 7/2002 | Chong | |
| 6,434,960 B1 | 8/2002 | Rousseau | |
| 6,438,978 B1 | 8/2002 | Bessler | |
| 6,446,618 B1 | 9/2002 | Hill | |
| 6,462,492 B1 | 10/2002 | Sakamoto et al. | |
| 6,471,486 B1 | 10/2002 | Centers et al. | |
| 6,523,361 B2 | 2/2003 | Higashiyama | |
| 6,532,754 B2 | 3/2003 | Haley et al. | |
| 6,539,734 B1 | 4/2003 | Weyna | |
| 6,578,373 B1 | 6/2003 | Barbier | |
| 6,583,593 B2 | 6/2003 | Iijima et al. | |
| 6,636,011 B2 | 10/2003 | Sadasivam et al. | |
| 6,670,784 B2 | 12/2003 | Odachi et al. | |
| 6,688,124 B1 | 2/2004 | Stark et al. | |
| 6,698,217 B2 | 3/2004 | Tanimoto et al. | |
| 6,708,507 B1 | 3/2004 | Sem et al. | |
| 6,711,911 B1 | 3/2004 | Grabon et al. | |
| 6,714,425 B2 | 3/2004 | Yamada et al. | |
| 6,735,284 B2 | 5/2004 | Cheong et al. | |
| 6,749,404 B2 | 6/2004 | Gennami et al. | |
| 6,753,670 B2 | 6/2004 | Kadah | |
| 6,756,753 B1 | 6/2004 | Marcinkiewicz | |
| 6,756,757 B2 | 6/2004 | Marcinkiewicz et al. | |
| 6,758,050 B2 | 7/2004 | Jayanth et al. | |
| 6,767,851 B1 | 7/2004 | Rokman et al. | |
| 6,788,024 B2 | 9/2004 | Kaneko et al. | |
| 6,815,925 B2 | 11/2004 | Chen et al. | |
| 6,825,637 B2 | 11/2004 | Kinpara et al. | |
| 6,828,751 B2 | 12/2004 | Sadasivam et al. | |
| 6,831,439 B2 | 12/2004 | Won et al. | |
| 6,876,171 B2 | 4/2005 | Lee | |
| 6,915,646 B2 | 7/2005 | Kadle et al. | |
| 6,955,039 B2 | 10/2005 | Nomura et al. | |
| 6,966,759 B2 | 11/2005 | Hahn et al. | |
| 6,967,851 B2 | 11/2005 | Yang et al. | |
| 6,982,533 B2 | 1/2006 | Seibel et al. | |
| 6,984,948 B2 | 1/2006 | Nakata et al. | |
| 7,005,829 B2 | 2/2006 | Schnetzka | |
| 7,049,774 B2 | 5/2006 | Chin et al. | |
| 7,095,208 B2 | 8/2006 | Kawaji et al. | |
| 7,138,777 B2 | 11/2006 | Won et al. | |
| 7,143,594 B2 | 12/2006 | Ludwig et al. | |
| 7,154,237 B2 | 12/2006 | Welchko et al. | |
| 7,176,644 B2 | 2/2007 | Ueda et al. | |
| 7,184,902 B2 | 2/2007 | El-Ibiary | |
| 7,208,895 B2 | 4/2007 | Marcinkiewicz et al. | |
| 7,234,305 B2 | 6/2007 | Nomura et al. | |
| 7,272,018 B2 | 9/2007 | Yamada et al. | |
| 7,307,401 B2 | 12/2007 | Gataric et al. | |
| 7,342,379 B2 | 3/2008 | Marcinkiewicz et al. | |
| 7,375,485 B2 | 5/2008 | Shahi et al. | |
| 7,458,223 B2 | 12/2008 | Pham | |
| 7,554,271 B2 | 6/2009 | Thiery et al. | |
| 7,580,272 B2 | 8/2009 | Taguchi et al. | |
| 7,595,613 B2 | 9/2009 | Thompson et al. | |
| 7,605,570 B2 | 10/2009 | Liu et al. | |
| 7,613,018 B2 | 11/2009 | Lim et al. | |
| 7,644,591 B2 | 1/2010 | Singh et al. | |
| 7,660,139 B2 | 2/2010 | Garabandic | |
| 7,667,986 B2 | 2/2010 | Artusi et al. | |
| 7,675,759 B2 | 3/2010 | Artusi et al. | |
| 7,683,568 B2 | 3/2010 | Pande et al. | |
| 7,688,608 B2 | 3/2010 | Oettinger et al. | |
| 7,706,143 B2 | 4/2010 | Lang et al. | |
| 7,723,964 B2 | 5/2010 | Taguchi | |
| 7,733,678 B1 | 6/2010 | Notohamiprodjo et al. | |
| 7,738,228 B2 | 6/2010 | Taylor | |
| 7,782,033 B2 | 8/2010 | Turchi et al. | |
| 7,821,237 B2 | 10/2010 | Melanson | |

(56) References Cited

U.S. PATENT DOCUMENTS

| | | |
|---|---|---|
| 7,895,003 B2 | 2/2011 | Caillat |
| 2001/0022939 A1 | 9/2001 | Morita et al. |
| 2002/0047635 A1 | 4/2002 | Ribarich et al. |
| 2002/0062656 A1 | 5/2002 | Suitou et al. |
| 2002/0108384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 | 1/2003 | Rossi et al. |
| 2003/0077179 A1 | 4/2003 | Collins et al. |
| 2003/0085621 A1 | 5/2003 | Potega |
| 2003/0094004 A1 | 5/2003 | Pham et al. |
| 2003/0146290 A1* | 8/2003 | Wang et al. ............... 236/49.3 |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0107716 A1 | 6/2004 | Hirota |
| 2004/0119434 A1 | 6/2004 | Dadd |
| 2004/0183491 A1 | 9/2004 | Sidey |
| 2004/0221594 A1 | 11/2004 | Suzuki et al. |
| 2004/0261431 A1 | 12/2004 | Singh et al. |
| 2004/0261448 A1 | 12/2004 | Nishijima et al. |
| 2005/0047179 A1 | 3/2005 | Lesea |
| 2005/0204760 A1 | 9/2005 | Kurita et al. |
| 2005/0235660 A1* | 10/2005 | Pham .............................. 62/126 |
| 2005/0235661 A1 | 10/2005 | Pham |
| 2005/0235662 A1 | 10/2005 | Pham |
| 2005/0235663 A1 | 10/2005 | Pham |
| 2005/0235664 A1 | 10/2005 | Pham |
| 2005/0247073 A1 | 11/2005 | Hikawa et al. |
| 2005/0262849 A1 | 12/2005 | Nomura et al. |
| 2005/0270814 A1 | 12/2005 | Oh |
| 2006/0041335 A9 | 2/2006 | Rossi et al. |
| 2006/0042276 A1* | 3/2006 | Doll et al. ..................... 62/129 |
| 2006/0048530 A1 | 3/2006 | Jun et al. |
| 2006/0056210 A1 | 3/2006 | Yamada et al. |
| 2006/0090490 A1 | 5/2006 | Grimm et al. |
| 2006/0117773 A1 | 6/2006 | Street et al. |
| 2006/0123809 A1 | 6/2006 | Ha et al. |
| 2006/0130501 A1 | 6/2006 | Singh et al. |
| 2006/0150651 A1 | 7/2006 | Goto et al. |
| 2006/0158912 A1 | 7/2006 | Wu et al. |
| 2006/0185373 A1 | 8/2006 | Butler et al. |
| 2006/0187693 A1 | 8/2006 | Tang |
| 2006/0198172 A1 | 9/2006 | Wood |
| 2006/0198744 A1 | 9/2006 | Lifson et al. |
| 2006/0247895 A1 | 11/2006 | Jayanth |
| 2006/0255772 A1 | 11/2006 | Chen |
| 2006/0261830 A1 | 11/2006 | Taylor |
| 2006/0290302 A1 | 12/2006 | Marcinkiewicz et al. |
| 2007/0012052 A1 | 1/2007 | Butler et al. |
| 2007/0029987 A1 | 2/2007 | Li |
| 2007/0040524 A1 | 2/2007 | Sarlioglu et al. |
| 2007/0040534 A1 | 2/2007 | Ghosh et al. |
| 2007/0089424 A1* | 4/2007 | Venkataramani et al. ...... 60/773 |
| 2007/0118307 A1 | 5/2007 | El-Ibiary |
| 2007/0118308 A1 | 5/2007 | El-Ibiary |
| 2007/0132437 A1 | 6/2007 | Scollo et al. |
| 2007/0144354 A1 | 6/2007 | Muller et al. |
| 2007/0289322 A1 | 12/2007 | Mathews |
| 2008/0089792 A1 | 4/2008 | Bae et al. |
| 2008/0110610 A1 | 5/2008 | Lifson et al. |
| 2008/0112823 A1 | 5/2008 | Yoshida et al. |
| 2008/0143289 A1 | 6/2008 | Marcinkiewicz et al. |
| 2008/0160840 A1 | 7/2008 | Bax et al. |
| 2008/0209925 A1 | 9/2008 | Pham |
| 2008/0216494 A1 | 9/2008 | Pham et al. |
| 2008/0232065 A1 | 9/2008 | Lang et al. |
| 2008/0245083 A1 | 10/2008 | Tutunoglu et al. |
| 2008/0252269 A1 | 10/2008 | Feldtkeller et al. |
| 2008/0265847 A1 | 10/2008 | Woo et al. |
| 2008/0272745 A1 | 11/2008 | Melanson |
| 2008/0272747 A1 | 11/2008 | Melanson |
| 2008/0273356 A1 | 11/2008 | Melanson |
| 2008/0284399 A1 | 11/2008 | Oettinger et al. |
| 2008/0285318 A1 | 11/2008 | Tan et al. |
| 2009/0015214 A1 | 1/2009 | Chen |
| 2009/0015225 A1 | 1/2009 | Turchi et al. |
| 2009/0016087 A1 | 1/2009 | Shimizu |
| 2009/0033296 A1 | 2/2009 | Hammerstrom |
| 2009/0039852 A1 | 2/2009 | Fishelov et al. |
| 2009/0059625 A1 | 3/2009 | Viitanen et al. |
| 2009/0071175 A1 | 3/2009 | Pham |
| 2009/0090117 A1 | 4/2009 | McSweeney |
| 2009/0090118 A1 | 4/2009 | Pham et al. |
| 2009/0091961 A1 | 4/2009 | Hsia et al. |
| 2009/0092501 A1 | 4/2009 | Seibel |
| 2009/0093911 A1 | 4/2009 | Caillat |
| 2009/0094997 A1 | 4/2009 | McSweeney |
| 2009/0094998 A1 | 4/2009 | McSweeney et al. |
| 2009/0095002 A1 | 4/2009 | McSweeney et al. |
| 2009/0112368 A1 | 4/2009 | Mann, III et al. |
| 2009/0140680 A1 | 6/2009 | Park |
| 2009/0237963 A1 | 9/2009 | Prasad et al. |
| 2009/0243561 A1 | 10/2009 | Tan et al. |
| 2009/0255278 A1 | 10/2009 | Taras et al. |
| 2009/0273330 A1 | 11/2009 | Sisson |
| 2009/0290395 A1 | 11/2009 | Osaka |
| 2009/0295347 A1 | 12/2009 | Popescu et al. |
| 2009/0303765 A1 | 12/2009 | Shimizu et al. |
| 2009/0316454 A1 | 12/2009 | Colbeck et al. |
| 2010/0007317 A1 | 1/2010 | Yang |
| 2010/0014326 A1 | 1/2010 | Gu et al. |
| 2010/0014329 A1 | 1/2010 | Zhang et al. |
| 2010/0052601 A1 | 3/2010 | Pummer |
| 2010/0052641 A1 | 3/2010 | Popescu et al. |
| 2010/0057263 A1 | 3/2010 | Tutunoglu |
| 2010/0079125 A1 | 4/2010 | Melanson et al. |
| 2010/0080026 A1 | 4/2010 | Zhang |
| 2010/0109615 A1 | 5/2010 | Hwang et al. |
| 2010/0109626 A1 | 5/2010 | Chen |
| 2010/0118571 A1 | 5/2010 | Saint-Pierre |
| 2010/0118576 A1 | 5/2010 | Osaka |
| 2010/0128503 A1 | 5/2010 | Liu et al. |
| 2010/0156377 A1 | 6/2010 | Siegler |
| 2010/0165683 A1 | 7/2010 | Sugawara |
| 2010/0179703 A1 | 7/2010 | Singh et al. |
| 2010/0181930 A1 | 7/2010 | Hopwood et al. |
| 2010/0187914 A1 | 7/2010 | Rada et al. |
| 2010/0202169 A1 | 8/2010 | Gaboury et al. |
| 2010/0226149 A1 | 9/2010 | Masumoto |
| 2010/0246220 A1 | 9/2010 | Irving et al. |
| 2010/0246226 A1 | 9/2010 | Ku et al. |
| 2010/0253307 A1 | 10/2010 | Chen et al. |
| 2010/0259230 A1 | 10/2010 | Boothroyd |
| 2010/0270984 A1 | 10/2010 | Park et al. |
| 2011/0138826 A1 | 6/2011 | Lifson et al. |
| 2012/0279251 A1 | 11/2012 | Kido et al. |
| 2014/0033746 A1 | 2/2014 | McSweeney |

FOREIGN PATENT DOCUMENTS

| | | |
|---|---|---|
| CN | 1532474 A | 9/2004 |
| CN | 1697954 A | 11/2005 |
| CN | 1806478 A | 7/2006 |
| CN | 1830131 A | 9/2006 |
| CN | 1987258 A | 6/2007 |
| DE | 19859340 A1 | 7/2000 |
| DE | 10036378 A1 | 5/2001 |
| DE | 10328213 A1 | 1/2005 |
| EP | 0697086 A1 | 2/1996 |
| EP | 0697087 A1 | 2/1996 |
| EP | 1146299 A | 10/2001 |
| EP | 1209362 A2 | 5/2002 |
| EP | 1541869 A1 | 6/2005 |
| EP | 1580498 A2 | 9/2005 |
| JP | 55155134 A | 12/1980 |
| JP | 61272483 A | 12/1986 |
| JP | S6277539 A | 4/1987 |
| JP | 01167556 | 7/1989 |
| JP | 2004163 A | 1/1990 |

(56) References Cited

FOREIGN PATENT DOCUMENTS

| | | |
|---|---|---|
| JP | 03129255 A | 6/1991 |
| JP | 04344073 A | 11/1992 |
| JP | H05322224 A | 12/1993 |
| JP | 06159738 | 6/1994 |
| JP | 07035393 A | 2/1995 |
| JP | H0926246 A | 1/1997 |
| JP | 09196524 A | 7/1997 |
| JP | 10009683 A | 1/1998 |
| JP | 1998097331 | 4/1998 |
| JP | 10153353 A | 6/1998 |
| JP | 10160271 | 6/1998 |
| JP | H1123075 | 1/1999 |
| JP | 11159895 A | 6/1999 |
| JP | 11287497 A | 10/1999 |
| JP | 2000205630 A | 7/2000 |
| JP | 2000297970 A | 10/2000 |
| JP | 2001317470 A | 11/2001 |
| JP | 2002013858 A | 1/2002 |
| JP | 2002243246 A | 8/2002 |
| JP | 2003156244 | 5/2003 |
| JP | 2004069295 A | 3/2004 |
| JP | 2004135491 A | 4/2004 |
| JP | 2005-003710 A | 1/2005 |
| JP | 2005132167 A | 5/2005 |
| JP | 2005282972 A | 10/2005 |
| JP | 3799732 B2 | 7/2006 |
| JP | 2006177214 A | 7/2006 |
| JP | 2006188954 | 7/2006 |
| JP | 2006233820 | 9/2006 |
| JP | 2007198230 A | 8/2007 |
| JP | 2007198705 A | 8/2007 |
| JP | 4150870 B2 | 9/2008 |
| JP | 2009264699 A | 11/2009 |
| JP | 2010266132 A | 11/2010 |
| JP | 2011033340 A | 2/2011 |
| KR | 10-1996-0024115 | 7/1996 |
| KR | 2001-0044273 A | 6/2001 |
| KR | 2003-0011415 A | 2/2003 |
| KR | 2005-0059842 A | 6/2005 |
| KR | 20050085544 A | 8/2005 |
| KR | 20070071407 A | 7/2007 |
| WO | WO-9523943 A1 | 9/1995 |
| WO | WO-9523944 A1 | 9/1995 |
| WO | WO-9702729 A1 | 1/1997 |
| WO | WO-9911987 A1 | 3/1999 |
| WO | WO-9913225 A1 | 3/1999 |
| WO | WO-02/090840 A2 | 11/2002 |
| WO | WO-02/090913 A1 | 11/2002 |
| WO | WO-02090842 A2 | 11/2002 |
| WO | WO-03038987 A1 | 5/2003 |
| WO | 2004059822 A1 | 7/2004 |
| WO | WO-2004083744 A1 | 9/2004 |
| WO | WO-2005101939 A1 | 10/2005 |
| WO | WO-2006023075 A2 | 3/2006 |
| WO | WO-2009045495 A1 | 4/2009 |
| WO | WO-2009048466 A1 | 4/2009 |
| WO | WO-2009048575 A1 | 4/2009 |
| WO | WO-2009048576 A1 | 4/2009 |
| WO | WO-2009048577 A2 | 4/2009 |
| WO | WO-2009048578 A1 | 4/2009 |
| WO | WO-2009048579 A2 | 4/2009 |
| WO | WO-2009048566 A3 | 5/2009 |
| WO | WO-2009151841 A1 | 12/2009 |
| WO | WO-2011083756 A1 | 7/2011 |

OTHER PUBLICATIONS

Written Opinion of the International Searching Authority regarding International Application No. PCT/US2008/011576 dated Mar. 20, 2009.
International Search Report regarding International Application No. PCT/US2008/011464 dated Mar. 13, 2009.
Written Opinion of the International Searching Authority regarding International Application No. PCT/US2008/011464 dated Mar. 13, 2009.
International Preliminary Report on Patentability for International Application No. PCT/US2008/011442, dated Apr. 7, 2010.
International Preliminary Report on Patentability for International Application No. PCT/US2008/011596, dated Apr. 13, 2010.
International Preliminary Report on Patentability for International Application No. PCT/US2008/011441, dated Apr. 7, 2010.
International Preliminary Report on Patentability for International Application No. PCT/US2008/011570, dated Apr. 13, 2010.
International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Non-Final Office Action regarding U.S. Appl. No. 12/244,387, dated Mar. 3, 2011.
Non-Final Office Action regarding U.S. Appl. No. 12/246,825, dated Jan. 4, 2011.
Non-Final Office Action regarding U.S. Appl. No. 12/246,893, dated Apr. 1, 2011.
Non-Final Office Action regarding U.S. Appl. No. 12/247,033, dated Jan. 21, 2011.
Notification of the First Office Action from the State Intelletual Property Office of People's Republic of China regarding Chinese Application No. 200880110665.0, dated Apr. 8, 2011. Translation provided by Unitalen Attorneys at Law.
Notification of the First Office Action from the State Intelletual Property Office of People's Republic of China regarding Chinese (56) References Cited

OTHER PUBLICATIONS

Application No. 200880110551.6, dated Feb. 11, 2011. Translation provided by Unitalen Attorneys at Law.
"Electrical Power vs Mechanical Power," by Suvo, http://www.brighthubengineering.com/machine-design/62310-electrical-power-vs-mechanical-power/; dated Jan. 25, 2010; 2 pages.
"Solving System of Equations by Substitution," by http://cstl.syr.edu/fipse/algebra/unit5/subst.htm, dated Aug. 30, 2012; 4 pages.
Advisory Action regarding U.S. Appl. No. 14/739,207, dated Aug. 2, 2016.
Applicant-Initiated Interview Summary regarding U.S. Appl. No. 12/246,927, dated Sep. 5, 2012.
Applicant-Initiated Interview Summary regarding U.S. Appl. No. 12/247,020, dated Sep. 6, 2012.
Decision of Rejection from the State Intellectual Property Office for People's Republic of China regarding Chinese Patent Application No. 200880110616.7, dated Nov. 27, 2013.
European Search Report regarding Application No. 08836902.0—1602 / 2198159 PCT/US2008011464, dated Apr. 4, 2014.
European Search Report regarding Application No. 08837748.6—1608, dated Aug. 7, 2015.
European Search Report regarding Application No. 13161753.2—1602, dated Jul. 12, 2013.
Extended European Search Report regarding Application No. 08836944.2—1605 / 2198165 PCT/US2008011596, dated Dec. 4, 2014.
Extended European Search Report regarding Application No. 08837249.5—1605 / 2195540 PCT/US2008011589, dated Dec. 4, 2014.
Extended European Search Report regarding Application No. 08837504.3—1605 / 2198218 PCT/US2008011597, dated Dec. 3, 2014.
Extended European Search Report regarding Application No. 08837777.5—1605 / 2198160 PCT/US2008011590, dated Dec. 3, 2014.
Extended European Search Report regarding Application No. 08838154.6—1605 / 2195588 PCT/US2008011593, dated Dec. 4, 2014.
Final Office Action regarding U.S. Appl. No. 12/244,387, dated Aug. 17, 2011.
Final Office Action regarding U.S. Appl. No. 12/246,825, dated Jun. 14, 2011.
Final Office Action regarding U.S. Appl. No. 12/244,387, dated Aug. 13, 2012.
Final Office Action regarding U.S. Appl. No. 12/244,416, dated Nov. 15, 2011.
Final Office Action regarding U.S. Appl. No. 12/246,959, dated Oct. 12, 2011.
Final Office Action regarding U.S. Appl. No. 12/246,959, dated Dec. 4, 2012.
Final Office Action regarding U.S. Appl. No. 12/247,020, dated Jun. 6, 2012.
Final Office Action regarding U.S. Appl. No. 12/247,033, dated Jul. 5, 2012.
Final Office Action regarding U.S. Appl. No. 12/247,033, dated Jul. 12, 2011.
Final Office Action regarding U.S. Appl. No. 14/031,905, dated Jul. 23, 2014.
First Office Action regarding Chinese Patent Application No. 201310484685.7, dated May 20, 2015. Translation provided by Unitalen Attorneys at Law.
Fourth Office Action from the State Intellectual Property Office of People's Republic of China regarding Chinese Patent Application No. 200880110785.0, dated Oct. 21, 2013. Translation provided by Unitalen Attorneys at Law.
Interview Summary regarding U.S. Appl. No. 13/845,784, dated Jul. 6, 2015.
Non-Final Office Action regarding U.S. Appl. No. 12/246,927, dated Jun. 6, 2012.

Non-Final Office Action regarding U.S. Appl. No. 12/246,959, dated Jun. 13, 2012.
Non-Final Office Action regarding U.S. Appl. No. 12/247,033, dated Jan. 19, 2012.
Non-Final Office Action regarding U.S. Appl. No. 12/247,033, dated Jan. 29, 2013.
Notice of Allowance and Fee(s) Due regarding U.S. Appl. No. 12/246,959, dated Feb. 14, 2013.
Notice of Allowance and Fees Due regarding U.S. Appl. No. 12/246,927, dated Dec. 21, 2012.
Notice of Allowance and Fees Due regarding U.S. Appl. No. 12/247,020, dated Jan. 4, 2013.
Notice of Allowance and Fees Due regarding U.S. Appl. No. 12/983,615 dated Feb. 28, 2014.
Notice of Allowance and Fees Due regarding U.S. Appl. No. 12/983,615, dated May 23, 2014.
Notice of Allowance and Fees Due regarding U.S. Appl. No. 14/031,015, dated Apr. 27, 2015.
Notice of Allowance and Fees Due regarding U.S. Appl. No. 14/031,905, dated Mar. 23, 2015.
Notice of Grounds for Rejection from the Korean Intellectual Property Office regarding Korean Patent Application No. 10-2010-7009374, dated May 31, 2011. Translation provided by Y.S. Change & Associates.
Notification of Final Rejection from Korean Intellectual Property Office regarding Korean Patent Application No. 10-2010-7006707, dated Apr. 2, 2013. Translation provided by Y.S. Chang & Associates.
Notification of First Office action from the State Intellectual Property Office of People's Replublic of China regarding Chinese Patent Application No. 200880110484.8, dated Dec. 23, 2011. Translation provided by Unitalen Attorneys at Law.
Notification of First Office Action from the State Intellectual Property Office of People's Republic of China regarding Chinese Patent Aplication No. 200880110590.6, dated Feb. 29, 2012. Translation provided by Unitalen Attorneys at Law.
Notification of First Office Action from the State Intellectual Property Office of People's Republic of China regarding Chinese Patent Application No. 20080110616.7, dated Jul. 4, 2012. Translation provided by Unitalen Attorneys at Law.
Notification of Grounds for Refusal regarding Korean Patent Application No. 10-2010-7006707, dated Oct. 23, 2012. Translation provided by Y.S. Chang & Associates.
Notification of Grounds for Refusal regarding Korean Patent Application No. 10-2010-7006707, dated May 22, 2012. Translation provided by Y.S. Chang & Associates.
Notification of Grounds for Refusal regarding Korean Patent Application No. 10-2010-7007375, dated Dec. 7, 2011. Translation provided by Y.S. Chang & Associates.
Notification of Grounds for Refusal regarding Korean Patent Application No. 10-2010-7007581, dated Nov. 14, 2011. Translation provided by Y.S. Chang & Associates.
Notification of Grounds for Refusal regarding Korean Patent Application No. 10-2010-7007583, dated Dec. 28, 2011. Translation provided by Y.S. Chang & Associates.
Notification of Grounds for Refusal regarding Korean Patent Application No. 10-2010-7009659, dated Feb. 8, 2012.
Notification of the First Office Action from the State Intellectual Property Office of People's Republic of China regarding Chinese Application No. 2008801110726, dated Jun. 5, 2012. Translation provided by Unitalen Attorneys at Law.
Notification of First Office Action from the State Intellectual Property Office of People's Republic of China regarding Chinese Patent Applications No. 200880111091.9 dated Nov. 23, 2011. Translation provided by Unitalen Attorneys at Law.
Notification of the Second Office Action from the State Intellectual Property Office of People's Republic of China regarding Chinese Patent Application No. 200880110665.0, dated Apr. 5, 2012. Translation provided by Unitalen Attorneys at Law.
Office Action regarding Chinese Patent Application No. 201410312784.1, dated Aug. 3, 2016. Translation provided by Unitalen Attorneys At Law.

(56) References Cited

OTHER PUBLICATIONS

Office Action regarding Chinese Patent Application No. 201410312784.1, dated Nov. 30, 2015. Translation provided by Unitalen Attorneys at Law.
Office Action regarding European Patent Application No. 08835849.4, dated Aug. 5, 2016.
Office Action regarding India Patent Application No. 536/MUMNP/2010, dated Dec. 31, 2015.
Office Action regarding U.S. Appl. No. 12/246,825, dated Oct. 12, 2011.
Office Action regarding U.S. Appl. No. 12/246,959, dated Jun. 21, 2011.
Office Action regarding U.S. Appl. No. 13/893,493, dated Jul. 14, 2016.
Office Action regarding U.S. Appl. No. 14/739,207, dated Dec. 31, 2015.
Office Action regarding U.S. Appl. No. 14/739,207, dated May 20, 2016.
Office Action regarding U.S. Appl. No. 12/244,387, dated Mar. 1, 2012.
Office Action regarding U.S. Appl. No. 12/244,416, dated Aug. 8, 2011.
Office Action regarding U.S. Appl. No. 12/246,893, dated Dec. 7, 2011.
Office Action regarding U.S. Appl. No. 12/246,893, dated Aug. 1, 2011.
Office Action regarding U.S. Appl. No. 12/246,927, dated Sep. 6, 2011.
Office Action regarding U.S. Appl. No. 12/247,020, dated Sep. 1, 2011.
Office Action regarding U.S. Appl. No. 14/031,905, dated Dec. 13, 2013.
Restriction Requirement regarding U.S. Appl. No. 13/893,493, dated Mar. 29, 2016.
Search Report regarding European Patent Application No. 08835849.4—1608 / 2198157 PCT/US2008011441, dated Jun. 9, 2015.
Search Report regarding European Patent Application No. 08836567.1—1608 / 2198158 PCT/US2008011442, dated Jun. 9, 2015.
Search Report regarding European Patent Application No. 08837748.6—1608 / 2201437 PCT/US2008011570, dated Aug. 7, 2015.
Second Office Action from the State Initellectual Property Office of People's Republic of China regarding Chinese Patent Application No. 200880110484.8, dated Aug. 17, 2012. Translation provided by Unitalen Attorneys at Law.
Second Office Action from the State Intellectual Property Office of People's Republic of China regarding Chinese Patent Application No. 200880110616.7, dated Apr. 1, 2013. Translation provided by Unitalen Attorneys at Law.
Second Office Action from the State Intellectual Property Office of People's Republic of China regarding Chinese Patent Application No. 200880110785.0, dated Dec. 28, 2012. Translation provided by Unitalen Attorneys at Law.
Second Office Action from the State Intellectual Property Office of People's Republic of China regarding Chinese Patent Application No. 2008801110726, dated Mar. 15, 2013. Translation provided by Unitalen Attorneys at Law.
Second Office Action from the State Intellectual Property Office of People's Republic of China regarding Chinese Patent Application No. 201110371859.X, dated Jun. 23, 2014. Translation provided by Unitalen Attorneys at Law.
Supplementary European Search Report regarding Application No. 08837095.2—1605 / 2195539 PCT/US2008011576, dated Nov. 25, 2014.
Third Chinese Office Action from the State Intellectual Property Office of People's Republic of China regarding Chinese Patent Application No. 200880111091.9, dated Feb. 18, 2013. Translation provided by Unitalen Attorneys at Law.
Third Office Action from the State Intellectual Property Office of People's Republic of China regarding Chinese Patent Application No. 200880110616.7, dated Jul. 22, 2013. Translation provided by Unitalen Attorneys at Law.
Third Office Action from the State Intellectual Property Office of People's Republic of China regarding Chinese Patent Application No. 2008801110726, dated Sep. 12, 2013. Translation provided by Unitalen Attorneys at Law.
U.S. Office Action regarding U.S. Appl. No. 13/845,784, dated May 11, 2015.

* cited by examiner

SYSTEM AND METHOD FOR CALIBRATING PARAMETERS FOR A REFRIGERATION SYSTEM WITH A VARIABLE SPEED COMPRESSOR

CROSS-REFERENCE TO RELATED APPLICATIONS

This application claims the benefit of U.S. Provisional Application No. 60/978,292, filed on Oct. 8, 2007. The application also claims the benefit of U.S. Provisional Application No. 60/978,258, filed on Oct. 8, 2007. The entire disclosures of each of the above applications are incorporated herein by reference.

FIELD

The present disclosure relates to compressors and more particularly to a system and method for calibrating parameters of a refrigeration system with a variable speed compressor.

BACKGROUND

The statements in this section merely provide background information related to the present disclosure and may not constitute prior art.

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to insure that the particular application (i.e., refrigeration, heat pump, HVAC, or chiller system) functions properly. A variable speed compressor may be used to vary compressor capacity according to refrigeration system load. Operating parameters of the compressor and of the refrigeration system may be used by protection, control, and diagnostic systems to insure optimal operation of the compressor and refrigeration system components. For example, evaporator temperature and/or condenser temperature may be used to diagnose, protect, and control the compressor and other refrigeration system components.

SUMMARY

A system is provided comprising a compressor connected to a condenser and an evaporator, a condenser sensor that outputs a condenser signal corresponding to at least one of a sensed condenser pressure and a sensed condenser temperature, an inverter drive that modulates a frequency of electric power delivered to the compressor to modulate a speed of the compressor, and a control module connected to the inverter drive. The control module that determines a measured condenser temperature based on the condenser signal, monitors electric power data and compressor speed data from the inverter drive, calculates a derived condenser temperature based on the electric power data, the compressor speed data, and compressor map data for the compressor, compares the measured condenser temperature with the derived condenser temperature, and selectively updates the compressor map data based on the comparison.

In other features, the control module may calculate a difference between the derived condenser temperature and the calculated condenser temperature, compare the difference with a predetermined threshold, and select one of the derived condenser temperature and the calculated condenser temperature as being more accurate when the difference is greater than the predetermined threshold.

In other features, the control module may generate an alarm when the difference is greater than the predetermined threshold.

A method is provided and includes receiving a condenser signal corresponding to at least one of a condenser pressure and a condenser temperature of a condenser connected to a compressor and an evaporator, modulating a speed of the compressor with an inverter drive configured to modulate a frequency of electric power delivered to the compressor, receiving electric power data and compressor speed data from the inverter drive, calculating a derived condenser temperature based on the electric power data, the compressor speed data, and compressor map data associated with the compressor, determining a measured condenser temperature based on the condenser signal, comparing the derived condenser temperature with the measured condenser temperature, and selectively updating the compressor map data based on the comparing.

In other features, the method may include calculating a difference between the derived condenser temperature and the calculated condenser temperature, comparing the difference with a predetermined threshold, and selecting one of the derived condenser temperature and the calculated condenser temperature as being more accurate when the difference is greater than the predetermined threshold.

In other features, the method may include generating an alarm when the difference is greater than the predetermined threshold.

Another system is provided and comprises a compressor connected to a condenser and an evaporator, an evaporator sensor that outputs an evaporator signal corresponding to at least one of a sensed evaporator pressure and a sensed evaporator temperature, a discharge temperature sensor that outputs a discharge temperature signal corresponding to a temperature of refrigerant exiting the compressor, an inverter drive that modulates a frequency of electric power delivered to the compressor to modulate a speed of the compressor, and a control module connected to the inverter drive. The control module may determine a measured evaporator temperature based on the evaporator signal, monitor electric power data and compressor speed data from the inverter drive, calculate a derived evaporator temperature based on the electric power data, the compressor speed data, the discharge temperature signal, and compressor map data for the compressor, compare the measured condenser temperature with the derived condenser temperature, and selectively update said compressor map data based on the comparison.

In other features, the control module may calculate a difference between the derived evaporator temperature and the calculated evaporator temperature, compare the difference with a predetermined threshold, and select one of the derived evaporator temperature and the calculated evaporator temperature as being more accurate when the difference is greater than the predetermined threshold.

In other features, the control module may generate an alarm when the difference is greater than the predetermined threshold.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the terms module, control module, and controller refer to one or more of the following: An application specific integrated circuit (ASIC), an electronic circuit, a processor (shared, dedicated, or group) and memory that execute one or more software or firmware programs, a combinational logic circuit, or other suitable components that provide the described functionality. As used herein, computer readable medium refers to any medium capable of storing data for a computer. Computer-readable medium includes, but is not limited to, memory, RAM, ROM, PROM, EPROM, EEPROM, flash memory, CD-ROM, floppy disk, magnetic tape, other magnetic medium, optical medium, or any other device or medium capable of storing data for a computer.

Figure 1:
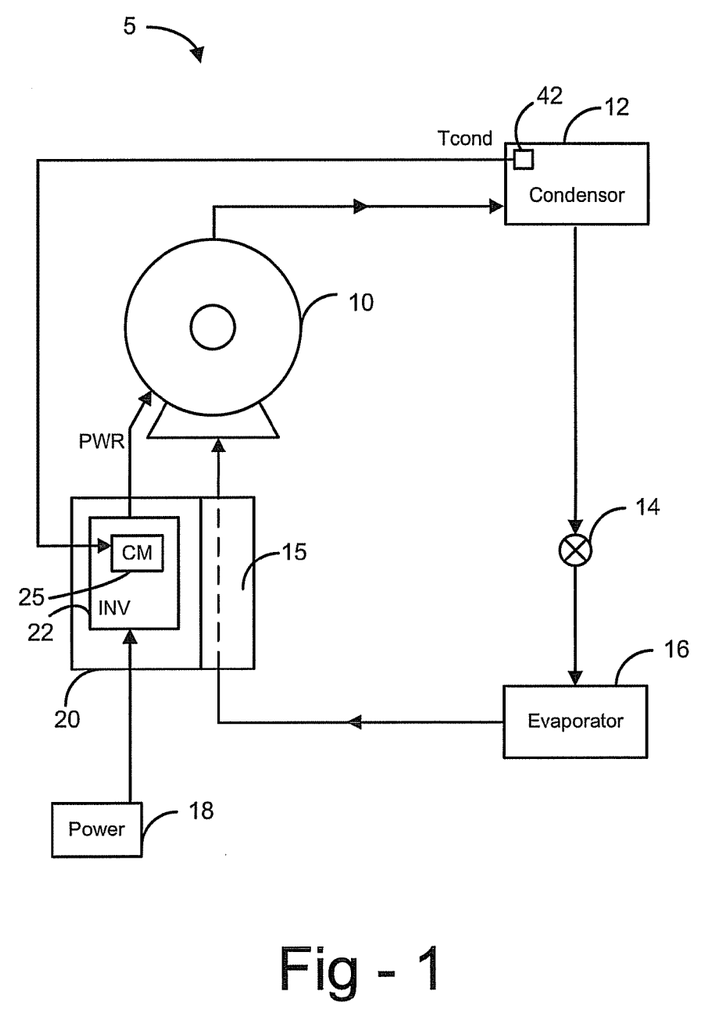
FIG. 1 is a schematic view of a refrigeration system.

With reference to FIG. 1, an exemplary refrigeration system 5 includes a compressor 10 that compresses refrigerant vapor. While a specific refrigeration system is shown in FIG. 1, the present teachings are applicable to any refrigeration system, including heat pump, HVAC, and chiller systems. Refrigerant vapor from compressor 10 is delivered to a condenser 12 where the refrigerant vapor is liquefied at high pressure, thereby rejecting heat to the outside air. The liquid refrigerant exiting condenser 12 is delivered to an evaporator 16 through an expansion valve 14. Expansion valve 14 may be a mechanical or electronic valve for controlling super heat of the refrigerant. The refrigerant passes through expansion valve 14 where a pressure drop causes the high pressure liquid refrigerant to achieve a lower pressure combination of liquid and vapor. As hot air moves across evaporator 16, the low pressure liquid turns into gas, thereby removing heat from evaporator 16. The low pressure gas is again delivered to compressor 10 where it is compressed to a high pressure gas, and delivered to condenser 12 to start the refrigeration cycle again.

Compressor 10 may be driven by an inverter drive 22, also referred to as a variable frequency drive (VFD), housed in an enclosure 20. Enclosure 20 may be near compressor 10. Inverter drive 22 receives electrical power from a power supply 18 and delivers electrical power to compressor 10. Inverter drive 22 includes a control module 25 with a processor and software operable to modulate and control the frequency of electrical power delivered to an electric motor of compressor 10. Control module 25 includes a computer readable medium for storing data including the software executed by the processor to modulate and control the frequency of electrical power delivered to the electric motor of compressor and the software necessary for control module 25 to execute and perform the protection and control algorithms of the present teachings. By modulating the frequency of electrical power delivered to the electric motor of compressor 10, control module 25 may thereby modulate and control the speed, and consequently the capacity, of compressor 10.

Inverter drive 22 includes solid state electronics to modulate the frequency of electrical power. Generally, inverter drive 22 converts the inputted electrical power from AC to DC, and then converts the electrical power from DC back to AC at a desired frequency. For example, inverter drive 22 may directly rectify electrical power with a full-wave rectifier bridge. Inverter driver 22 may then chop the electrical power using insulated gate bipolar transistors (IGBT's) or thyristors to achieve the desired frequency. Other suitable electronic components may be used to modulate the frequency of electrical power from power supply 18.

Electric motor speed of compressor 10 is controlled by the frequency of electrical power received from inverter driver 22. For example, when compressor 10 is driven at sixty hertz electric power, compressor 10 may operate at full capacity operation. When compressor 10 is driven at thirty hertz electric power, compressor 10 may operate at half capacity operation.

Control module 25 may generate data corresponding to compressor current and/or compressor power during the routines executed to modulate the electric power delivered to the electric motor of compressor 10. Control module 25 may utilize data corresponding to compressor current and/or compressor power to calculate and derive other compressor and refrigeration system parameters.

As described in the disclosure titled "VARIABLE SPEED COMPRESSOR PROTECTION SYSTEM AND METHOD", U.S. Application Ser. No. 60/978,258, which is incorporated herein by reference, suction super heat (SSH) and discharge super heat (DSH) may be used to monitor or predict a flood back condition or overheat condition of compressor 10. As described therein, condenser temperature (Tcond) may be used to derive DSH. Likewise, evaporator temperature (Tevap) may be used to derive SSH.

A compressor floodback or overheat condition is undesirable and may cause damage to compressor 10 or other refrigeration system components. Suction super heat (SSH) and/or discharge super heat (DSH) may be correlated to a flood back or overheating condition of compressor 10 and may be monitored to detect and/or predict a flood back or overheating condition of compressor 10. DSH is the difference between the temperature of refrigerant vapor leaving the compressor, referred to as discharge line temperature (DLT) and the saturated condenser temperature (Tcond). Suction super heat (SSH) is the difference between the temperature of refrigerant vapor entering the compressor, referred to as suction line temperature (SLT) and saturated evaporator temperature (Tevap).

Figure 5:
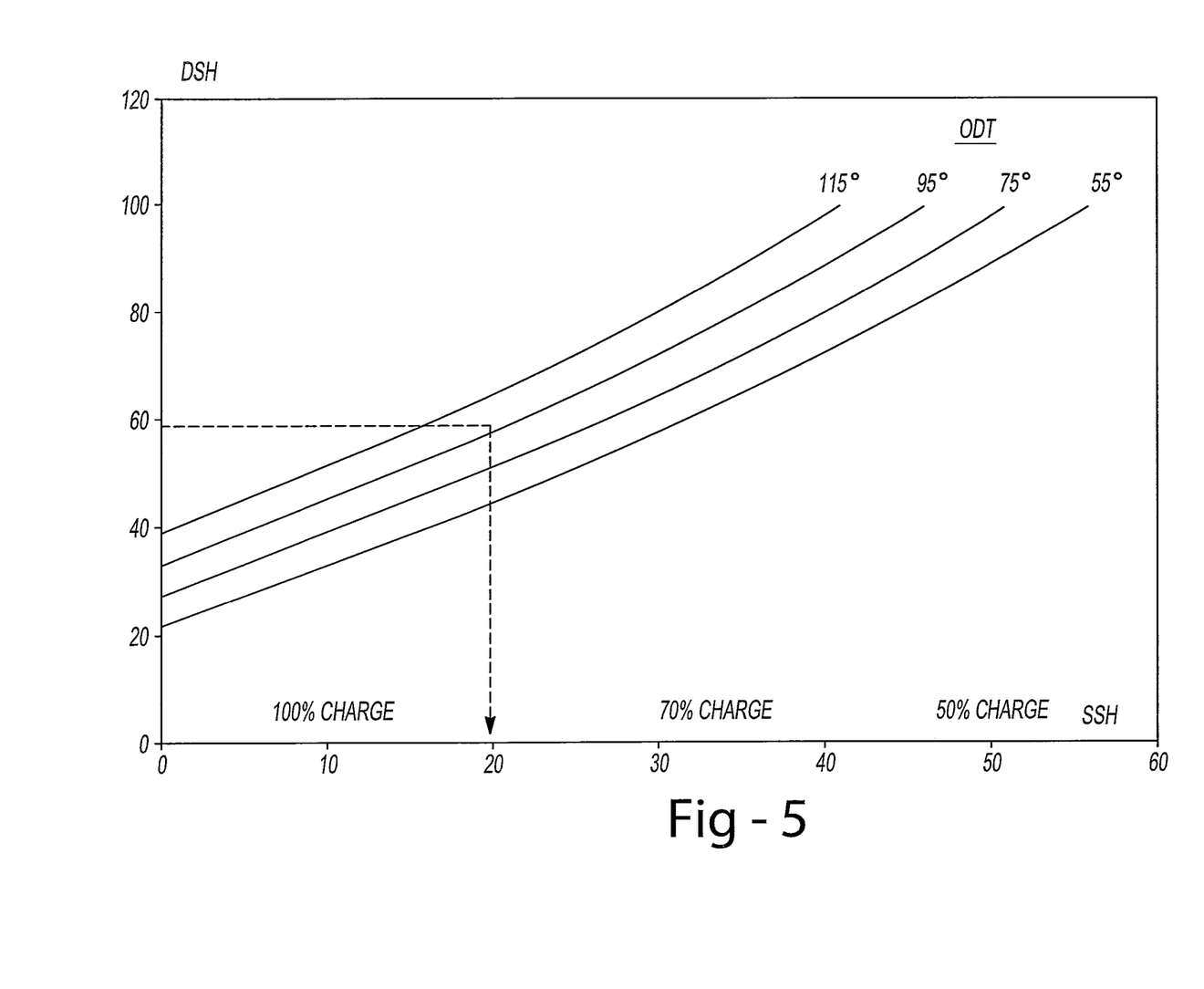
FIG. 5 is a graph showing discharge super heat correlated with suction super heat and outdoor temperature.

SSH and DSH may be correlated as shown in FIG. 5. The correlation between DSH and SSH may be particularly accurate for scroll type compressors, with outside ambient temperature being only a secondary effect. As shown in FIG.

5, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 5 is an example only and specific correlations for specific compressors may vary by compressor type, model, capacity, etc.

A flood back condition may occur when SSH is approaching zero degrees or when DSH is approaching twenty to forty degrees Fahrenheit. For this reason, DSH may be used to detect the onset of a flood back condition and its severity. When SSH is at zero degrees, SSH may not indicate the severity of the flood back condition. As the floodback condition becomes more severe, SSH remains at around zero degrees. When SSH is at zero degrees, however, DSH may be between twenty and forty degrees Fahrenheit and may more accurately indicate the severity of a flood back condition. When DSH is in the range of thirty degrees Fahrenheit to eighty degrees Fahrenheit, compressor 10 may operate within a normal range. When DSH is below thirty degrees Fahrenheit, the onset of a flood back condition may be occur. When DSH is below ten degrees Fahrenheit, a severe flood back condition may occur.

With respect to overheating, when DSH is greater than eighty degrees Fahrenheit, the onset of an overheating condition may occur. When DSH is greater than one-hundred degrees Fahrenheit, a severe overheating condition may be present.

In FIG. 5, typical SSH temperatures for exemplar refrigerant charge levels are shown. For example, as the percentage of refrigerant charge in refrigeration system 5 decreases, SSH typically increases.

As further described in the disclosure titled "VARIABLE SPEED COMPRESSOR PROTECTION SYSTEM AND METHOD", U.S. Application Ser. No. 60/978,258, which is incorporated herein by reference, Tcond may be a function of compressor power and compressor speed. Control module 25 may derive Tcond based on compressor power or current and compressor speed. As further described in the disclosure, control module 25 may use Tcond to derive other parameters including compressor capacity, power, energy efficiency ratio, load, Kwh/Day, etc.

Tcond may be derived from other system parameters. Specifically, Tcond may be derived from compressor current and voltage (i.e., compressor power), compressor speed, and compressor map data associated with compressor 10. A method for deriving Tcond based on current, voltage and compressor map data for a fixed speed compressor is described in the commonly assigned application for Compressor Diagnostic and Protection System, U.S. application Ser. No. 11/059,646, Publication No. U.S. 2005/0235660. Compressor map data for a fixed speed compressor correlating compressor current and voltage to Tcond may be compressor specific and based on test data for a specific compressor type, model and capacity.

In the case of a variable speed compressor, Tcond may also be a function of compressor speed, in addition to compressor power.

Figure 6:
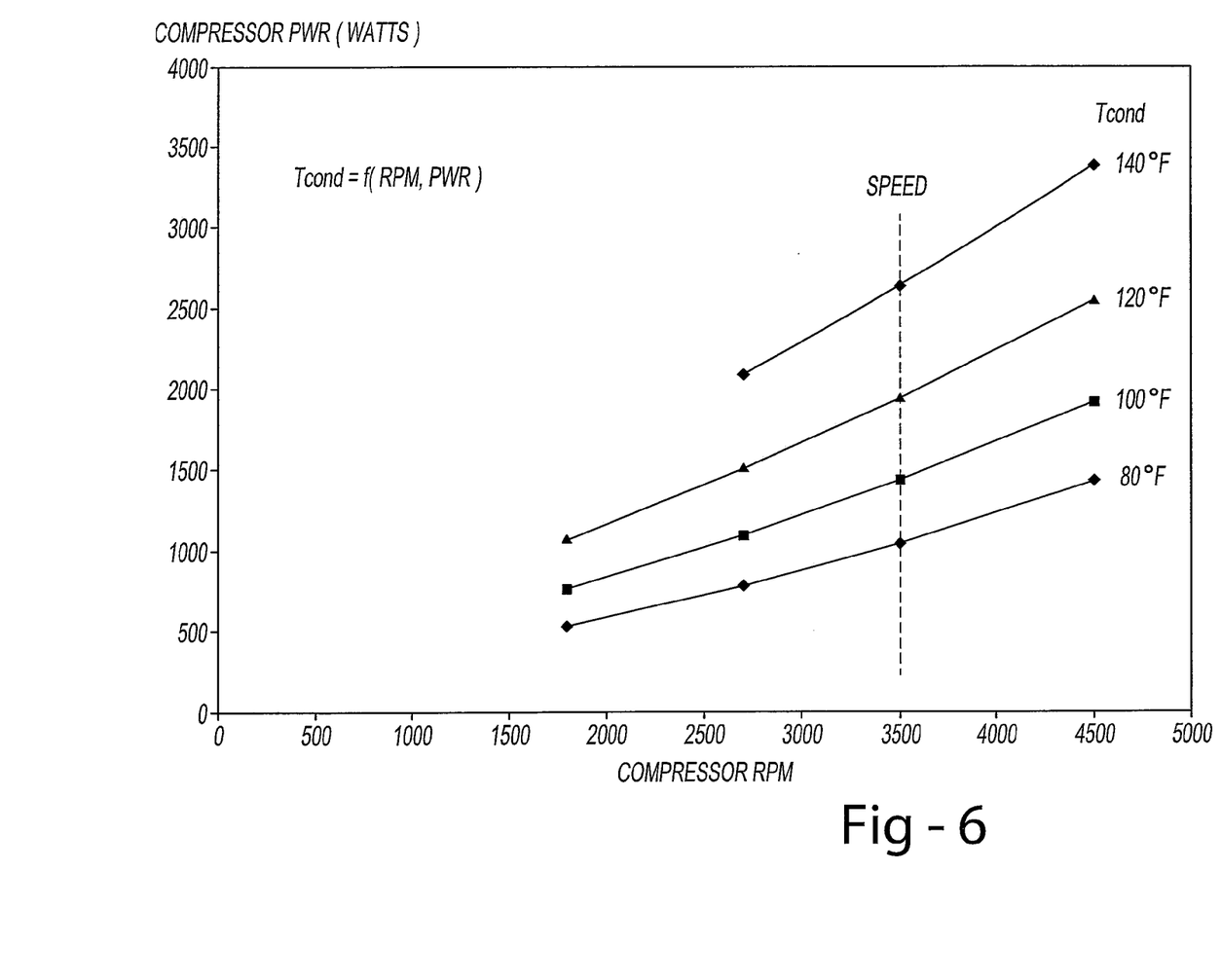
FIG. 6 is a graph showing condenser temperature correlated with compressor power and compressor speed.

A graphical correlation between compressor power in watts and compressor speed is shown in FIG. 6. As shown, Tcond is a function of compressor power and compressor speed. In this way, a three-dimensional compressor map with data correlating compressor power, compressor speed, and Tcond may be derived for a specific compressor based on test data. Compressor current may be used instead of compressor power. Compressor power, however, may be preferred over compressor current to reduce the impact of any line voltage variation. The compressor map may be stored in a computer readable medium accessible to control module 25.

In this way, control module 25 may calculate Tcond based on compressor power data and compressor speed data. Control module 25 may calculate, monitor, or detect compressor power data during the calculations performed to convert electrical power from power supply 18 to electrical power at a desired frequency. In this way, compressor power and current data may be readily available to control module 25. In addition, control module 25 may calculate, monitor, or detect compressor speed based on the frequency of electrical power delivered to the electric motor of compressor 10. In this way, compressor speed data may also be readily available to control module 25. Based on compressor power and compressor speed, control module 25 may derive Tcond.

Figure 8:
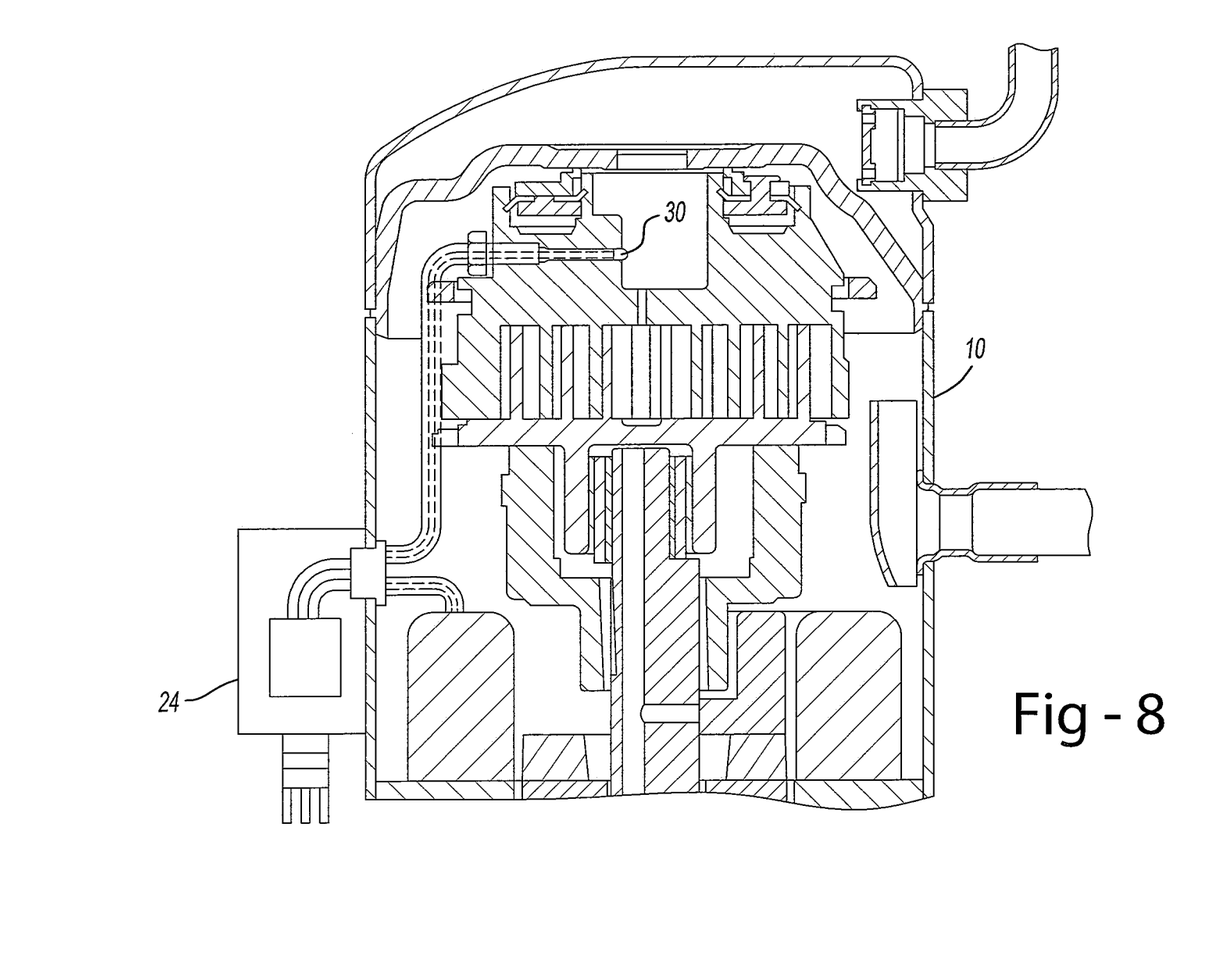
FIG. 8 is a cross-section view of a compressor.

After measuring or calculating Tcond, control module 25 may calculate DSH as the difference between Tcond and DLT, with DLT data being receiving from external DLT sensor 28 or internal DLT sensor 30 (as shown in FIG. 8).

As further described in the disclosure titled "VARIABLE SPEED COMPRESSOR PROTECTION SYSTEM AND METHOD", U.S. Application Ser. No. 60/978,258, which is incorporated herein by reference, Tevap may be a function of compressor power, compressor speed, and DLT. Control module 25 may derive Tevap based on compressor power or current, compressor speed, and DLT. Control module 25 may use Tevap to derive other parameters including compressor capacity, power, energy efficiency ratio, load, Kwh/Day, etc.

Tevap and Tcond may be determined by using compressor map data, for different speeds, based on DLT and compressor power, based on the following equations:

$$Tevap = f(\text{compressor power}, \text{compressor speed}, DLT) \quad \text{Equation 1}$$

$$Tcond = f(\text{compressor power}, \text{compressor speed}, DLT) \quad \text{Equation 2}$$

Because Tevap may be calculated from mass flow, Tcond, and compressor speed, control module 25 may derive mass flow from a difference in temperature between suction gas entering cold plate 15 (Ts) and a temperature of a heat sink (Ti) located on or near inverter drive 22. Control module 25 may calculate delta T according to the following equation:

$$\text{delta } T = Ts - Ti \quad \text{Equation 3}$$

Figure 7:
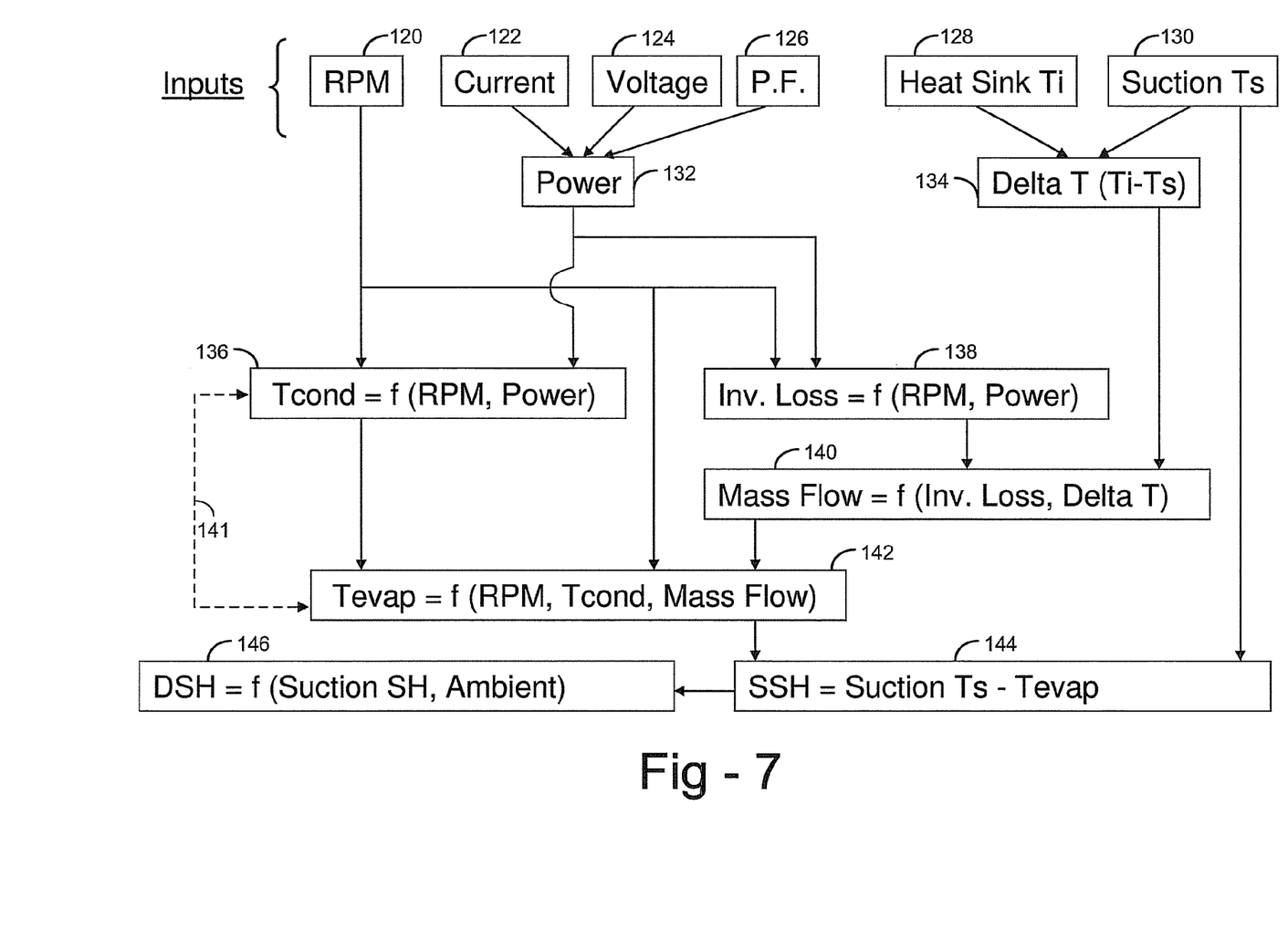
FIG. 7 is a flow chart showing derived data for a refrigeration system.

Control module 25 may determine mass flow based on delta T and by determining the applied heat of inverter drive 22. As shown in FIG. 7, mass flow may be derived based on lost heat of inverter drive 22 and delta T.

With reference to FIG. 7, inputs include compressor speed (RPM) 120, compressor current 122, compressor voltage 124, compressor power factor 126, Ti 128 and Ts 130. From compressor current 122, compressor voltage 124, and power factor 126, compressor power 132 is derived. From temperatures Ti 128 and Ts 130, delta T 134 is derived. From RPM 120 and power, Tcond 136 is derived. Also from RPM 120 and power 132, inverter heat loss 138 is derived. From inverter heat loss, and delta T 134, mass flow 140 is derived. From RPM 120, Tcond 136, and mass flow 140, Tevap 142 is derived. From Tevap 142 and Ts 130, SSH 144 is derived. From SSH 144 and ambient temperature as sensed by ambient temperature sensor 29, DSH 146 is derived. Once DSH 146 is derived, all of the benefits of the algorithms described above may be gained, including protection of compressor 10 from flood back and overheat conditions.

As shown by dotted line 141, Tcond and Tevap may be iteratively calculated to more accurately derive Tcond and Tevap. For example, optimal convergence may be achieved with three iterations. More or less iterations may also be used. Further, any of the calculated or derived variables described in FIG. 7 may alternatively be sensed or measured directly. In such the remaining variable may be calculated or derived based on the sensed or measured data.

DLT data may be received by an external DLT sensor 28. DLT sensor 28 may be a thermocouple located on the discharge tube extending from compressor 10. DLT data from DLT sensor 28 may correspond to a compressor discharge gas temperature. Alternatively, an internal DLT sensor 30 (as shown in FIG. 8), embedded within compressor 10, may be used. In other words, DLT sensor 30 may be incorporated inside compressor 10. In the case of a scroll compressor, DLT sensor 30 may be a thermistor exposed to the gas discharging from the compression mechanism and mounted on the non-orbiting scroll. The thermistor may be a positive temperature coefficient (PTC) or a negative temperature coefficient (NTC) thermistor. An internal DLT sensor, labeled as element 30, is shown in FIG. 8, mounted on the non-orbiting scroll of compressor 10.

In addition to deriving Tcond or Tevap from compressor power and compressor speed, Tcond or Tevap may be measured directly with a sensor. The derived Tcond or Tevap may be compared with the measured Tcond or Tevap. Based on the comparison, control module 25 may calibrate the derived parameter against the measured parameter to more accurately determine actual Tcond or Tevap.

With reference to FIG. 1, condenser 12 includes a condenser temperature sensor 42 that generates a signal corresponding to Tcond. Condenser sensor temperature 42 is connected to control module 25. In this way, control module 25 receives the Tcond measurement from condenser temperature sensor 42. Alternatively, a condenser pressure sensor may be used instead of condenser temperature sensor 42.

Figure 2:
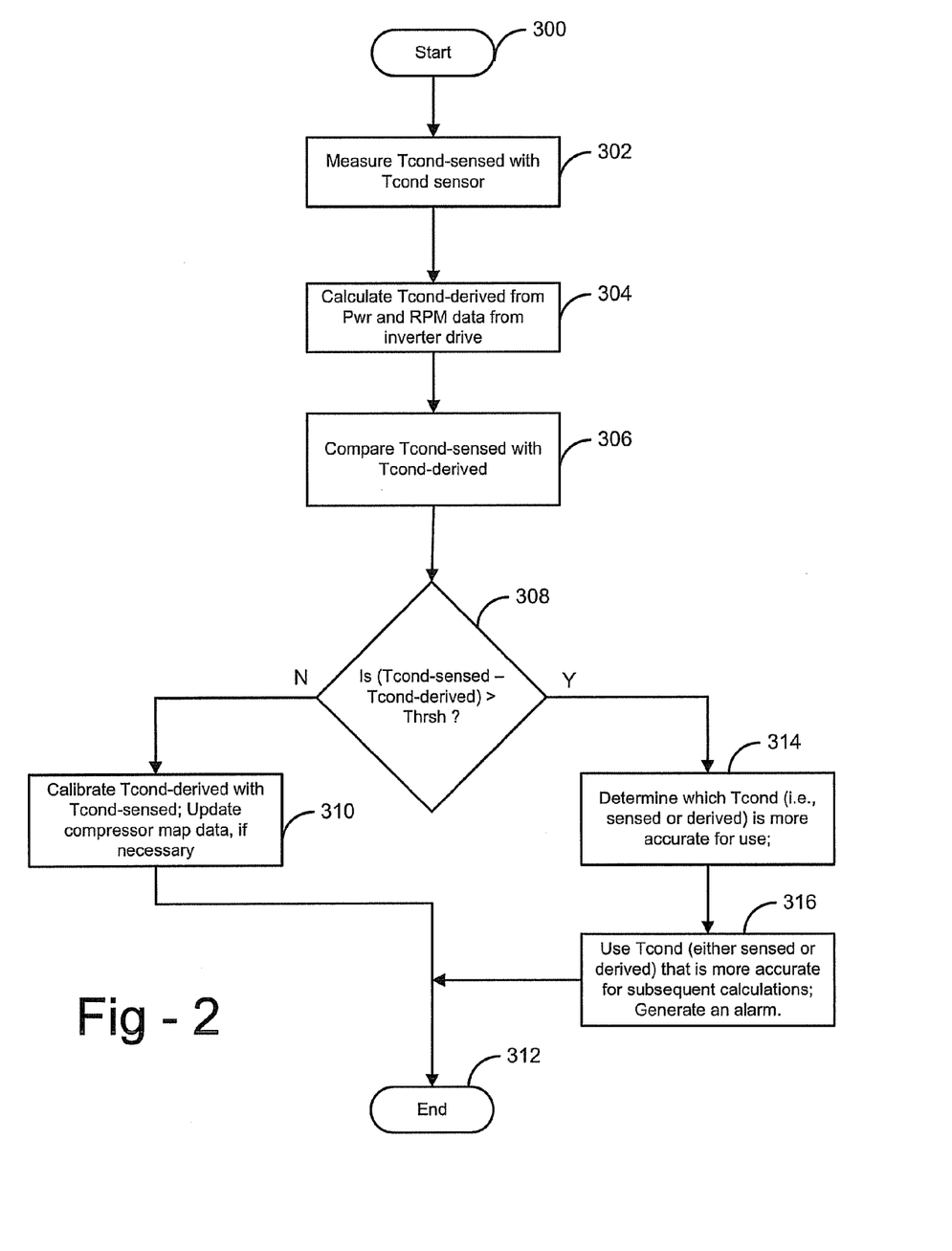
FIG. 2 is a flow chart illustrating an algorithm to calibrate condenser temperature.

As shown in FIG. 2, an algorithm for calibrating Tcond begins in step 300. In step 302, condenser temperature sensor 42 may measure Tcond and communicate Tcond to control module 25. In step 304, control module 25 may calculate Tcond from compressor power and compressor speed data from inverter drive 22, as described above and in the disclosure titled "VARIABLE SPEED COMPRESSOR PROTECTION SYSTEM AND METHOD", U.S. Application Ser. No. 60/978,258, which is incorporated herein by reference.

In step 306, control module 25 may compare the sensed Tcond with the calculated Tcond. In step 308, control module 25 may determine a difference between the sensed Tcond and the calculated Tcond. When the difference is less than a predetermined threshold in step 308, control module 25 may proceed to step 310. In step 310, control module 25 may calibrate the calculated Tcond with the measured Tcond.

Calibration may include updating compressor map data to more accurately reflect the measured Tcond. In this way, over time control module 25 may "learn" more accurate compressor map data for the compressor and may consequently be able to more accurately derive Tcond. Compressor map data may be stored in a computer readable medium accessible to control module 25. In addition, calibration may include determining an error parameter for condenser temperature sensor 42.

Thus, by measuring Tcond, calculating Tcond, and checking the measurement against the calculation, control module 25 may determine actual Tcond with high accuracy. The algorithm may end in step 312.

In step 308, when the difference is greater than the predetermined threshold, control module 25 may proceed to step 314 and determine whether the measured Tcond or the calculated Tcond is more accurate for use. Control module 25 may compare each of the measurement and the calculation to historical data for Tcond to determine which is closer to the historical Tcond. In this way, control module 25 may determine if the measurement or the calculation is correct for subsequent use.

In step 316, control module may then use the Tcond that is more accurate for subsequent calculations. In other words, control module 25 may proceed based on the Tcond (either sensed or derived) that is more accurate. In addition, control module 25 may generate an alarm to indicate a problem. For example, if control module 25 determines that the calculation is more accurate, condenser temperature sensor 42 may have malfunctioned. Control module 25 may generate an alarm to indicate that there has been a malfunction related to temperature condenser sensor 42. In addition, if control module 25 determines that the Tcond measurement is more accurate, control module 25 may generate an alarm to indicate a problem with the Tcond calculation. For example, an inaccurate calculation may be an indication of a malfunction of inverter drive 22 or that inverter drive 22 is not accurately reporting compressor speed or compressor power data.

Figure 3:
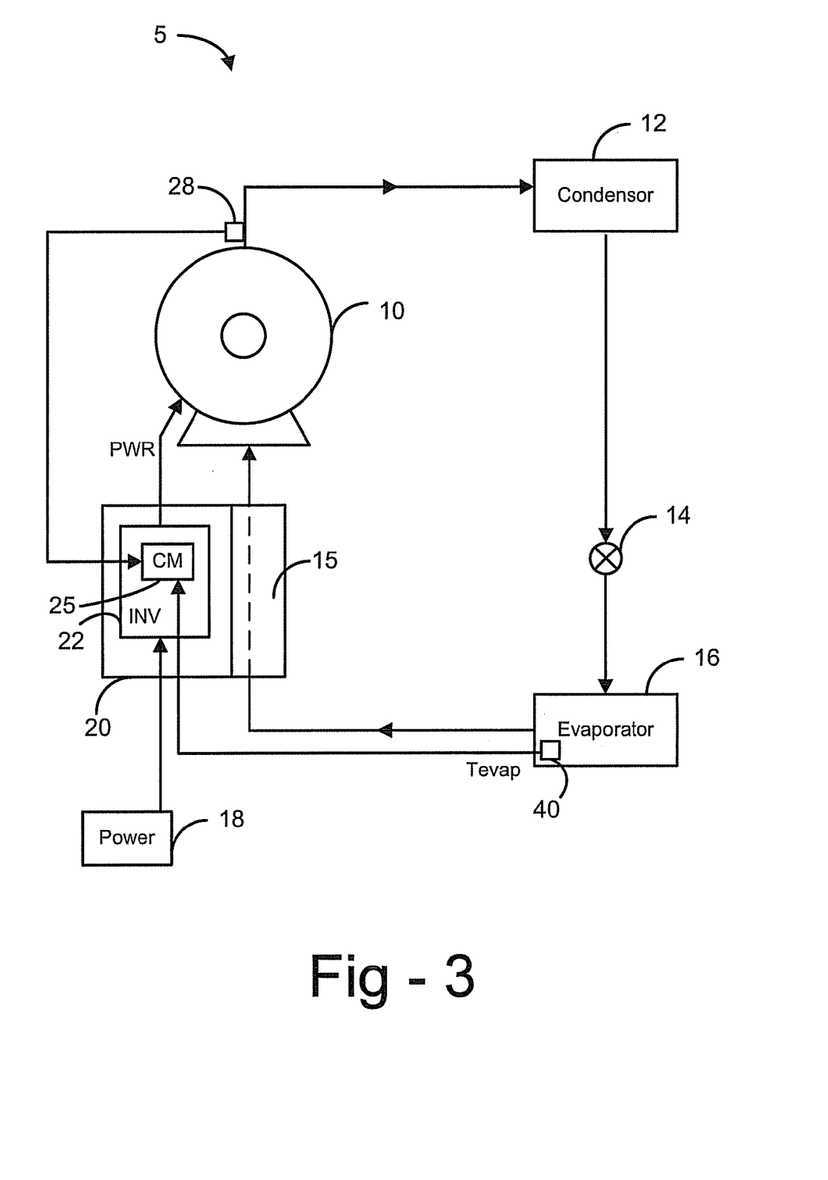
FIG. 3 is a schematic view of a refrigeration system.

As shown in FIG. 3, refrigeration system 5 may include evaporator 16 with an evaporator temperature sensor 40. An evaporator pressure sensor may alternatively be used. Evaporator temperature sensor 40 generates a signal corresponding to evaporator temperature and communicates Tevap to control module 25. Refrigeration system 5 may also include DLT sensor 28 for generating a DLT signal corresponding to DLT.

Figure 4:
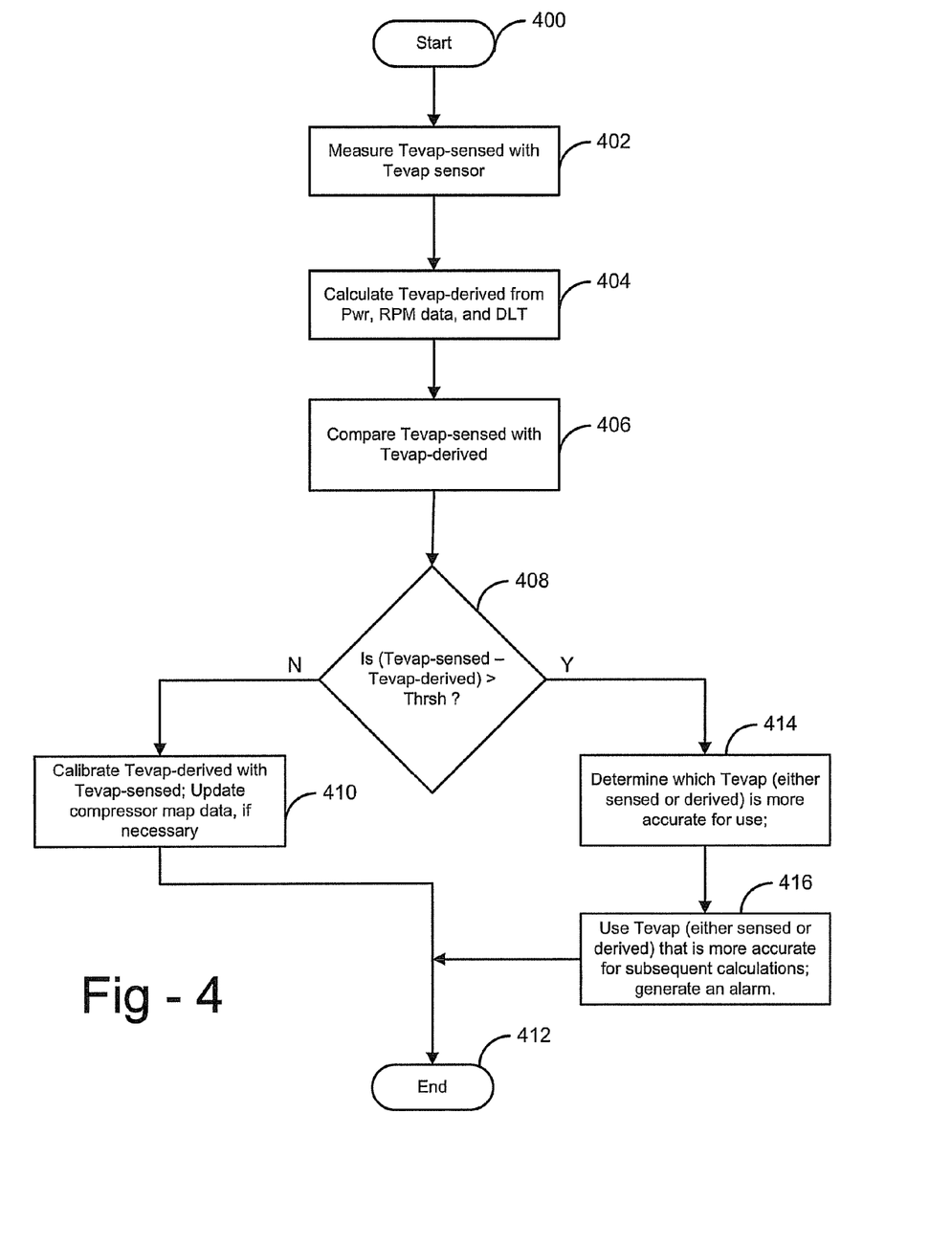
FIG. 4 is a flow chart illustrating an algorithm to calibrate evaporator temperature.

As shown in FIG. 4, an algorithm to calibrate Tevap starts in step 400. In step 402, evaporator temperature sensor 40 measures Tevap and reports Tevap to control module 25. In step 404, control module 25 calculates Tevap from compressor power, compressor speed data from inverter drive 22, and DLT.

In step 406, control module 25 compares the sensed or measured Tevap with the calculated Tevap. In step 408, control module 25 calculates a difference between the sensed Tevap and the calculated Tevap. When the difference is less than a predetermined threshold, control module 25 may proceed to step 410 and calibrate derived Tevap with measured Tevap. As with Tcond described above, control module 25 may update compressor map data if necessary to more accurately reflect measured Tevap. In this way, control module 25 may over time "learn" more accurate compressor map data. In addition, control module 25 may calculate an error parameter for evaporator temperature sensor 40. After step 410, the algorithm may end in step 412.

In step 408 when the difference is greater than the predetermined threshold, control module 25 may proceed to step 414 and determine whether the sensed or derived Tevap is more accurate for subsequent use. As with Tcond described above, control module 25 may compare both the sensed and calculated Tevap with historical data of Tevap to determine which is more accurate. When control module 25 has determined which Tevap is more accurate, control module 25 may proceed to step 416 and use the more accurate Tevap for subsequent calculations. In addition, control module 25 may generate an alarm indicating a problem with the Tevap measurement or calculation. For example, if the calculated Tevap is more accurate, control module 25 may generate an alarm indicating a malfunction associated with evaporator temperature sensor 40. If control module 25 determines that the measured Tevap is more accurate, control module 25 may generate an alarm indicating a malfunction associated with inverter drive 22. For example, inverter drive 22 may have malfunctioned with respect to calculating or reporting compressor speed, compressor power data, or DLT.

In this way, control module 25 may generate accurate Tevap and Tcond data for subsequent use in additional diagnostic, control and protection algorithms as described above and in the disclosure titled "VARIABLE SPEED COMPRESSOR PROTECTION SYSTEM AND METHOD", U.S. Application Ser. No. 60/978,258, which is incorporated herein by reference.

What is claimed is:

1. A system comprising:
    a compressor connected to a condenser and an evaporator;
    a condenser sensor that outputs a condenser signal corresponding to at least one of a sensed condenser pressure and a sensed condenser temperature;
    an inverter drive that modulates a frequency of electric power delivered to said compressor to modulate a speed of said compressor;
    a control module connected to said inverter drive that determines a measured condenser temperature based on said condenser signal, that monitors electric power data and compressor speed data from said inverter drive, that calculates a derived condenser temperature based on said monitored electric power data, said monitored compressor speed data, and compressor map data for said compressor, said compressor map data functionally correlating electric power data and compressor speed data with condenser temperature data for said compressor, and that compares said measured condenser temperature with said derived condenser temperature, and selectively updates said compressor map data based on said comparison.

2. The system of claim 1 wherein said control module calculates a difference between said derived condenser temperature and said calculated condenser temperature, compares said difference with a predetermined threshold, and selects one of said derived condenser temperature and said calculated condenser temperature as being more accurate when said difference is greater than said predetermined threshold.

3. The system of claim 2 wherein said control module generates an alarm when said difference is greater than said predetermined threshold.

4. A method comprising:
    receiving a condenser signal corresponding to at least one of a condenser pressure and a condenser temperature of a condenser connected to a compressor and an evaporator;
    modulating a speed of said compressor with an inverter drive configured to modulate a frequency of electric power delivered to said compressor;
    receiving electric power data and compressor speed data from said inverter drive;
    calculating a derived condenser temperature based on said received electric power data, said received compressor speed data, and compressor map data associated with said compressor, said compressor map data functionally correlating electric power data and compressor speed data with condenser temperature data for said compressor;
    determining a measured condenser temperature based on said condenser signal;
    comparing said derived condenser temperature with said measured condenser temperature; and
    selectively updating said compressor map data based on said comparing.

5. The method of claim 4 further comprising calculating a difference between said derived condenser temperature and said calculated condenser temperature, comparing said difference with a predetermined threshold, and selecting one of said derived condenser temperature and said calculated condenser temperature as being more accurate when said difference is greater than said predetermined threshold.

6. The method of claim 4 further comprising generating an alarm when said difference is greater than said predetermined threshold.

7. A system comprising:
    a compressor connected to a condenser and an evaporator;
    an evaporator sensor that outputs an evaporator signal corresponding to at least one of a sensed evaporator pressure and a sensed evaporator temperature;
    a discharge temperature sensor that outputs a discharge temperature signal corresponding to a temperature of refrigerant exiting said compressor;
    an inverter drive that modulates a frequency of electric power delivered to said compressor to modulate a speed of said compressor;
    a control module connected to said inverter drive that determines a measured evaporator temperature based on said evaporator signal, that monitors electric power data and compressor speed data from said inverter drive, that calculates a derived evaporator temperature based on said monitored electric power data, said monitored compressor speed data, said discharge temperature signal, and compressor map data for said compressor, said compressor map data functionally correlating electric power data, compressor speed data, and discharge temperature data with evaporator temperature data for said compressor, that compares said measured condenser temperature with said derived condenser temperature, and that selectively updates said compressor map data based on said comparison.

8. The system of claim 7 wherein said control module calculates a difference between said derived evaporator temperature and said calculated evaporator temperature, compares said difference with a predetermined threshold, and selects one of said derived evaporator temperature and said calculated evaporator temperature as being more accurate when said difference is greater than said predetermined threshold.

9. The system of claim 8 wherein said control module generates an alarm when said difference is greater than said predetermined threshold.

* * * * *